US012466236B2

(12) United States Patent
Suzuki et al.

(10) Patent No.: US 12,466,236 B2
(45) Date of Patent: Nov. 11, 2025

(54) MOVING BODY SETTING SYSTEM, MOVING BODY, METHOD AND COMPUTER READABLE STORAGE MEDIUM

(71) Applicant: HONDA MOTOR CO., LTD., Tokyo (JP)

(72) Inventors: Tomohiro Suzuki, Tokyo (JP); Shohei Kamochi, Tokyo (JP); Yukiya Ishikawa, Dublin, OH (US); Jason C D Chuang, Hilliard, OH (US); Thomas G Kracker, Marysville, OH (US); Derek S Adelman, Hilliard, OH (US); Thomas J. Buday, Jr., Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 303 days.

(21) Appl. No.: 18/127,664

(22) Filed: Mar. 29, 2023

(65) Prior Publication Data

US 2024/0326553 A1    Oct. 3, 2024

(51) Int. Cl.
*B60H 1/00* (2006.01)
*B60H 1/24* (2006.01)

(52) U.S. Cl.
CPC ......... *B60H 1/00814* (2013.01); *B60H 1/242* (2013.01); *B60H 1/244* (2013.01)

(58) Field of Classification Search
CPC .............. B60H 1/0065; B60H 1/00871; B60H 1/00771; B60H 1/00735; B60N 2/272;

(Continued)

(56) References Cited

U.S. PATENT DOCUMENTS 6,012,297 A  *  1/2000  Ichishi ............... B60H 1/00871
                                                      165/203
8,044,782 B2 * 10/2011  Saban .................... B60N 2/272
                                                      340/439

(Continued)

FOREIGN PATENT DOCUMENTS

JP        2020040543 A       3/2020

*Primary Examiner* — Yuri Kan

(57) ABSTRACT

A moving body setting system includes: an equipment control apparatus configured to control first equipment and second equipment included in a moving body; and a setting apparatus including: a storage unit configured to store setting information of each of the first equipment and the second equipment in association with user information; a user selection unit configured to select a user of the moving body; and a transmission control unit configured to read, from the storage unit, the setting information of the first equipment and the second equipment associated with user information of the user selected by the user selection unit, and perform control for transmitting, to the equipment control apparatus, first setting information which is based on the setting information of the first equipment that has been read and second setting information which is based on the setting information of the second equipment, and the equipment control apparatus is configured to change, when one setting information of the first setting information or the second setting information is received first and then the another setting information of the first setting information or the second setting information is received within a predetermined time, settings of both the first equipment and the second equipment based on the one setting information that has been received and the another setting information that has been received within the predetermined time.

12 Claims, 10 Drawing Sheets

(58) Field of Classification Search
CPC .... B60N 2/0027; B60N 2/5685; G06V 20/59; G06V 20/64; B60W 40/08; B60W 10/04; B60R 16/037; F25D 17/04
See application file for complete search history.

(56) References Cited

U.S. PATENT DOCUMENTS

| | | | | |
|---|---|---|---|---|
| 2004/0148953 | A1* | 8/2004 | Kurata | B60H 1/00735 62/324.1 |
| 2004/0212482 | A1 | 10/2004 | Kaneda | |
| 2013/0134150 | A1* | 5/2013 | Mizuno | B60N 2/5685 219/202 |
| 2014/0373563 | A1* | 12/2014 | Mizutani | F25D 17/04 62/186 |
| 2015/0183293 | A1* | 7/2015 | Kim | B60H 1/00771 236/1 C |
| 2017/0327125 | A1* | 11/2017 | Nordbruch | B60W 10/04 |
| 2018/0244174 | A1* | 8/2018 | Tan | B60N 2/0027 |
| 2019/0300006 | A1* | 10/2019 | Golsch | B60R 16/037 |
| 2021/0110182 | A1* | 4/2021 | Darnaud | G06V 20/64 |
| 2023/0294722 | A1* | 9/2023 | Lee | B60W 40/08 |
| 2024/0217522 | A1* | 7/2024 | Priya | G06V 20/59 |

\* cited by examiner

| USER ID | SETTING INFORMATION |
|---|---|
| A | SETTING INFORMATION A |
| B | SETTING INFORMATION B |
| C | SETTING INFORMATION C |
| D | SETTING INFORMATION D |
| E | SETTING INFORMATION E |

FIG.3

| RR Temp |
|---|
| RR Fan |
| RR Mode |
| RR Lock |

FIG.5

MOVING BODY SETTING SYSTEM, MOVING BODY, METHOD AND COMPUTER READABLE STORAGE MEDIUM

BACKGROUND

1. Technical Field

The present invention relates to a moving body setting system, a moving body, a method, and a computer readable storage medium.

2. Related Art

Cited Document 1 describes a technique related to an initial valve check of METER. Patent Document 2 describes a technique of reflecting individual settings of an air conditioning apparatus in a front seat and a rear seat.

PRIOR ART DOCUMENTS

Patent Documents

Patent Document 1: Japanese Patent Application Publication No. 2004-322838
Patent Document 2: Japanese Patent Application Publication No. 2020-040543

Incidentally, there is a problem that it is not easy to set a plurality of pieces of equipment included in a moving body. To solve the above-described problem, the present application aims at improving an operability for setting a plurality of pieces of equipment included in a moving body. In addition, the present application aims at further improving traffic safety to contribute to a development of a sustainable transportation system.

BRIEF DESCRIPTION OF THE DRAWINGS

FIG. 3 shows a data structure of user setting information stored in a storage unit 240.
FIG. 4 shows data items of setting information of first equipment 14a.
FIG. 5 shows data items of setting information of second equipment 14b.

DESCRIPTION OF EXEMPLARY EMBODIMENTS

Hereinafter, the present invention will be described through embodiments of the present invention, but the following embodiments do not limit the present invention according to claims. In addition, not all combinations of features described in the embodiments are essential to the solution of the invention.

Figure 1:
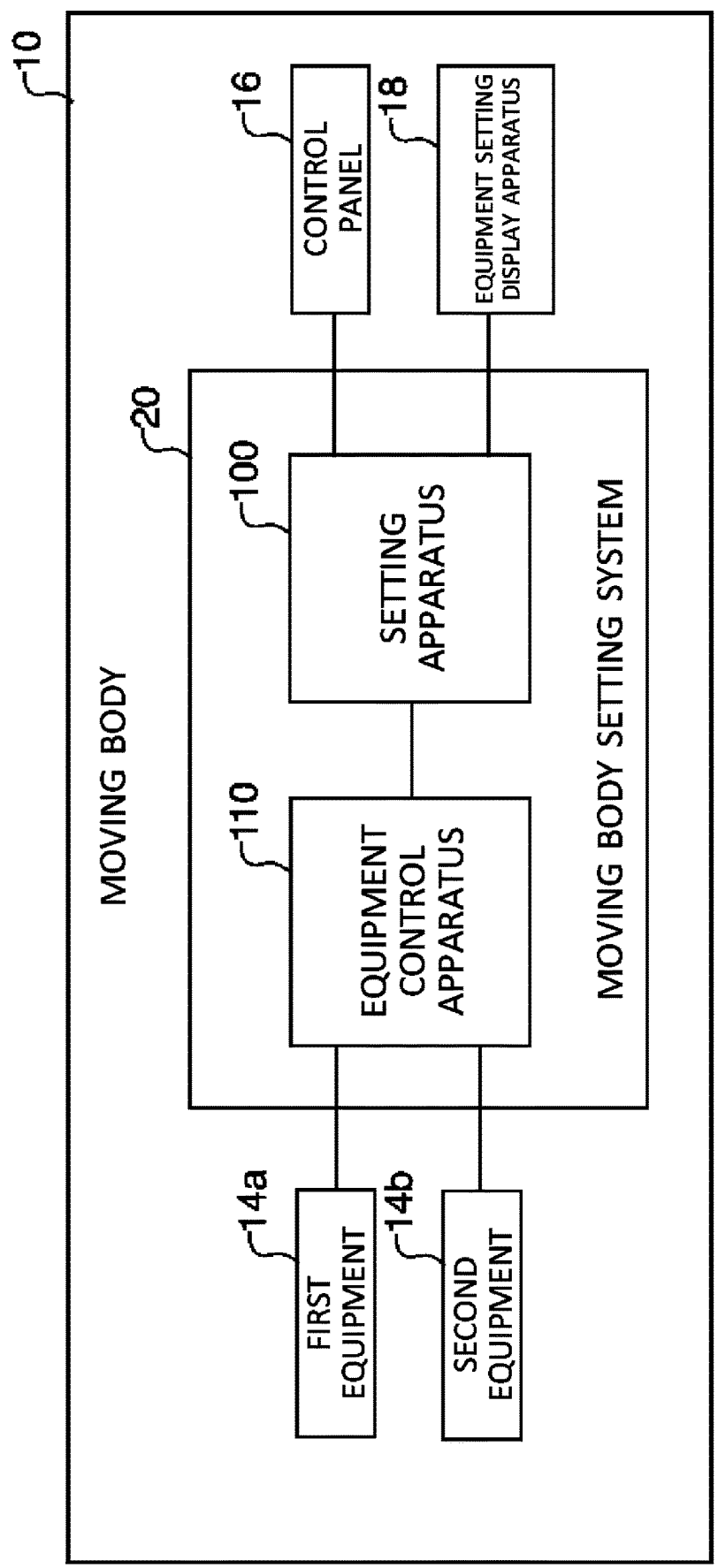
FIG. 1 conceptually shows a configuration of a moving body 10 according to an embodiment.

FIG. 1 conceptually shows a configuration of a moving body 10 according to an embodiment. The moving body 10 includes first equipment 14a, second equipment 14b, a moving body setting system 20, a control panel 16, and an equipment setting display apparatus 18. The moving body setting system 20 includes a setting apparatus 100 and an equipment control apparatus 110.

In the present embodiment, the moving body 10 is a vehicle. In the present embodiment, the first equipment 14a is a front seat air conditioner of the moving body 10, and the second equipment 14b is a rear seat air conditioner of the moving body 10. The first equipment 14a and the second equipment 14b are not limited to the air conditioners.

The control panel 16 constitutes a part of an instrument panel. The control panel 16 displays various types of information such as speed information and traveling distance information. The equipment setting display apparatus 18 displays setting states of the first equipment 14a and the second equipment 14b. The equipment setting display apparatus 18 is provided at a different position from the control panel 16.

Figure 2:
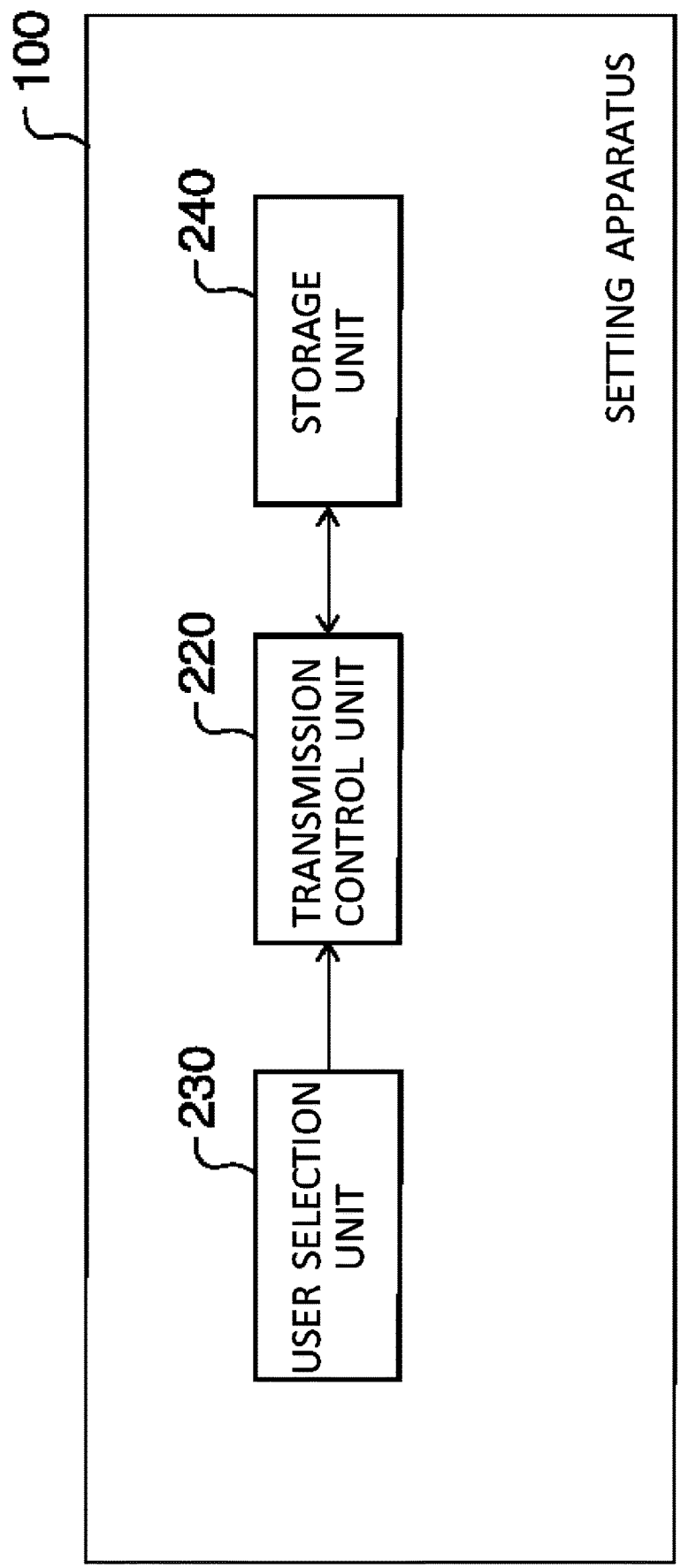
FIG. 2 conceptually shows a configuration of a setting apparatus 100.

FIG. 2 conceptually shows a configuration of a setting apparatus 100. The setting apparatus 100 includes a user selection unit 230, a transmission control unit 220, and a storage unit 240.

The equipment control apparatus 110 controls the first equipment 14a and the second equipment 14b included in the moving body 10. For example, the equipment control apparatus 110 is an ECU (Electronic Control Unit) which controls, for example, a front seat air conditioner and a rear seat air conditioner. The setting apparatus 100 and the equipment control apparatus 110 transmit and receive setting information using CAN (Controller Area Network) messages.

In the setting apparatus 100, the storage unit 240 stores setting information of each of the first equipment 14a and the second equipment 14b in association with user information. The user selection unit 230 selects a user of the moving body 10. For example, the user selection unit 230 selects a user of the moving body 10 based on an operation made by a user on board the moving body 10 for selecting the user of the moving body 10. Alternatively, the user selection unit 230 may receive identification information of an operation terminal of the moving body 10 such as a FOB key, that has been transmitted from the operation terminal, and select a user associated in advance with the received identification information as the user of the moving body 10.

The transmission control unit 220 reads, from the storage unit 240, setting information of the first equipment 14a and the second equipment 14b associated with user information of the user selected by the user selection unit 230, and performs control for transmitting, to the equipment control apparatus 110, first setting information which is based on the read setting information of the first equipment 14a and second setting information which is based on the read setting information of the second equipment 14b. At a timing at which both the first setting information and the second setting information that have been transmitted by the control of the transmission control unit 220 are received, the equipment control apparatus 110 changes settings of the first equipment 14a and the second equipment 14b based on the received first setting information and second setting information.

At a time when the moving body 10 is activated, the transmission control unit 220 determines a timing for transmitting the first setting information and the second setting information to the equipment control apparatus 110 such that the settings of the first equipment 14*a* and the second equipment 14*b* are completed within a predetermined period including a timing at which full lighting processing of the control panel 16 of the moving body 10, that is executed at the time when the moving body is activated, is completed.

When one setting information of the first setting information or the second setting information is received first and then another setting information of the first setting information or the second setting information is received within a predetermined time, the equipment control apparatus 110 changes the settings of both the first equipment 14*a* and the second equipment 14*b* based on the one setting information that has been received and the another setting information received within the predetermined time. When the another setting information is not received within the predetermined time since receiving the one setting information, the equipment control apparatus 110 changes the setting of the corresponding one of the first equipment 14*a* or the second equipment 14*b* based on the one setting information. In this case, the equipment control apparatus 110 may maintain the setting of the another equipment for which the setting information has not been able to be received, without changing the setting.

When the first setting information includes user information but the second setting information does not include user information and when the second setting information is received without the first setting information being received, the equipment control apparatus 110 discards the second setting information without changing the setting of the second equipment 14*b*.

When the setting information of the second equipment 14*b* is not received within a predetermined time since receiving the setting information of the first equipment 14*a*, the equipment control apparatus 110 may change the setting of the first equipment 14*a* based on the setting information of the first equipment 14*a* and not change the setting of the second equipment 14*b*. The transmission control unit 220 may determine, in consideration of the predetermined time, the timing for transmitting the first setting information and the second setting information to the equipment control apparatus 110 such that the settings of the first equipment 14*a* and the second equipment 14*b* are completed within the predetermined period including the timing at which the full lighting processing of the control panel of the moving body 10, that is executed at the time of the activation, is completed.

When the one setting information is received a plurality of times before the another setting information is received, the equipment control apparatus 110 may discard the setting information other than the setting information that has been received first out of the plurality of pieces of the one setting information that has been received a plurality of times, and when the another setting information is received, change the settings of both the first equipment 14*a* and the second equipment 14*b* based on the setting information that has been received first and the another setting information. When the another setting information is received a plurality of times after one setting information is received, the equipment control apparatus 110 may discard the setting information other than the setting information that has been received first out of the plurality of pieces of the another setting information that has been received a plurality of times, and change the settings of both the first equipment 14*a* and the second equipment 14*b* based on the one setting information and the setting information that has been received first out of the plurality of pieces of the another setting information that has been received a plurality of times.

FIG. 3 shows a data structure of user setting information stored in a storage unit 240. The user setting information includes a user ID and setting information as data items. In this manner, the storage unit 240 stores the user ID and the setting information in association with each other. The setting information includes setting information of the first equipment 14*a* and setting information of the second equipment 14*b*.

When a user of the moving body 10 is selected by the user selection unit 230, the transmission control unit 220 references the user setting information and acquires the setting information of the first equipment 14*a* and the second equipment 14*b* associated with a user ID of the user selected by the user selection unit 230. The transmission control unit 220 transmits the setting information of the first equipment 14*a* and the setting information of the second equipment 14*b* that have been acquired to the equipment control apparatus 110. Accordingly, operations of the first equipment 14*a* and the second equipment 14*b* can be set according to a preference of the user of the moving body 10.

Figure 4:
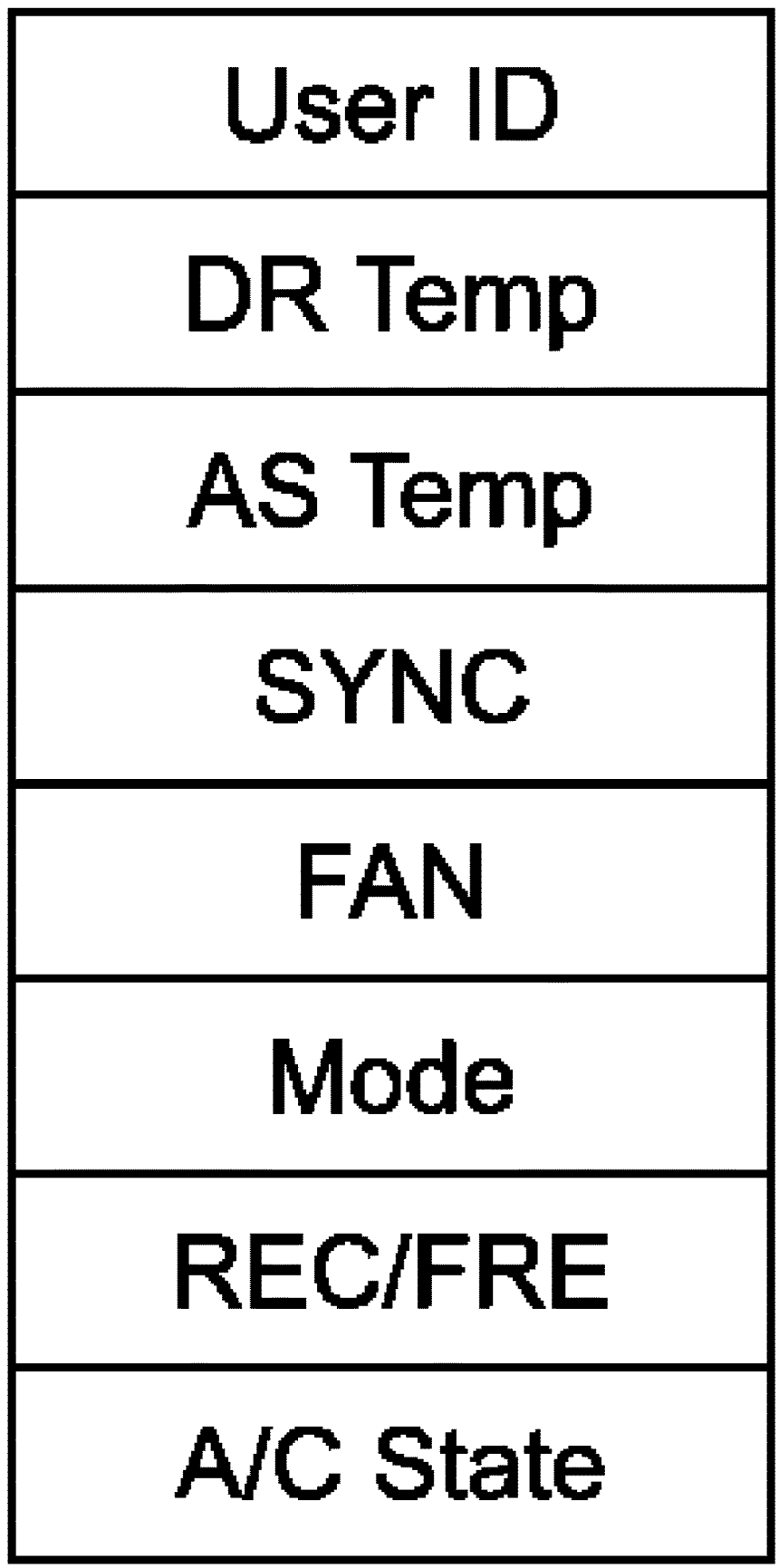

FIG. 4 shows data items of setting information of first equipment 14*a*. The setting information of the first equipment 14*a* includes User ID, DR Tempo, AS Temp, SYNC, FAN, Mode, REC/FRE, and A/C State.

User ID represents a user ID. DR Temp represents a setting temperature on a driver side. AS Temp represents a setting temperature on a passenger seat side. SYNC represents whether to cause an air conditioner setting for all seats to match with a front seat side air conditioner setting. FAN represents a setting air volume. Mode represents a setting of an air-blowing direction on the front seat side, for example, a setting of an air-blowing direction including face, feet, face and feet, defroster, and the like. REC/FRE represents which of inside air circulation and outside air introduction is to be performed. A/C State represents an operation state of a compressor.

Figure 5:
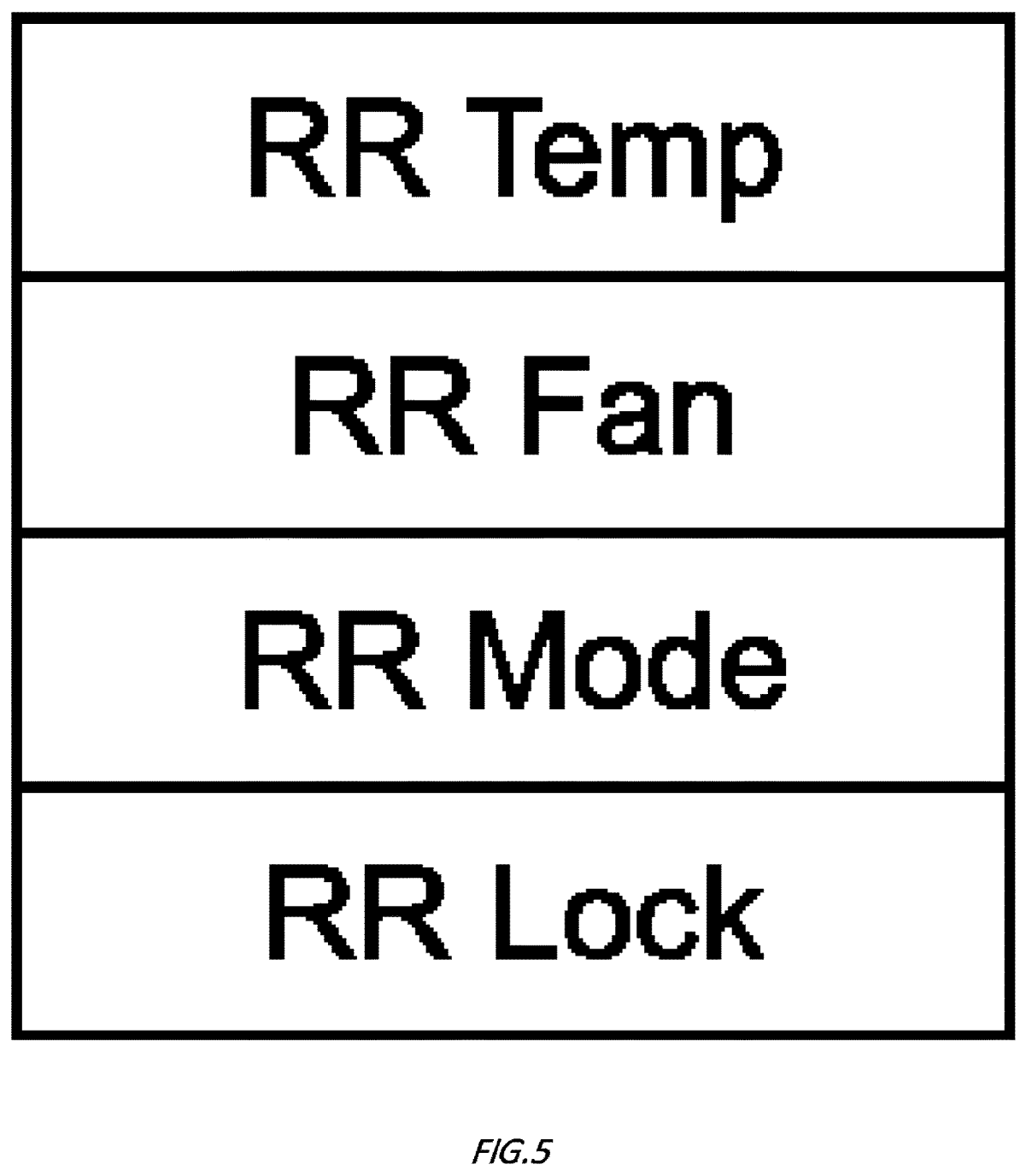

FIG. 5 shows data items of setting information of second equipment 14*b*. The setting information of the second equipment 14*b* includes RR Temp, RR Fan, RR Mode, and RR Lock.

RR Temp represents a setting temperature on the rear seat side. RR Fan represents a setting air volume on the rear seat side. RR Mode represents a setting of an air-blowing direction on the front seat side on the rear seat side. RR Lock represents whether to prohibit the rear seat side air conditioner from being set by a user on the rear seat side.

Figure 6:
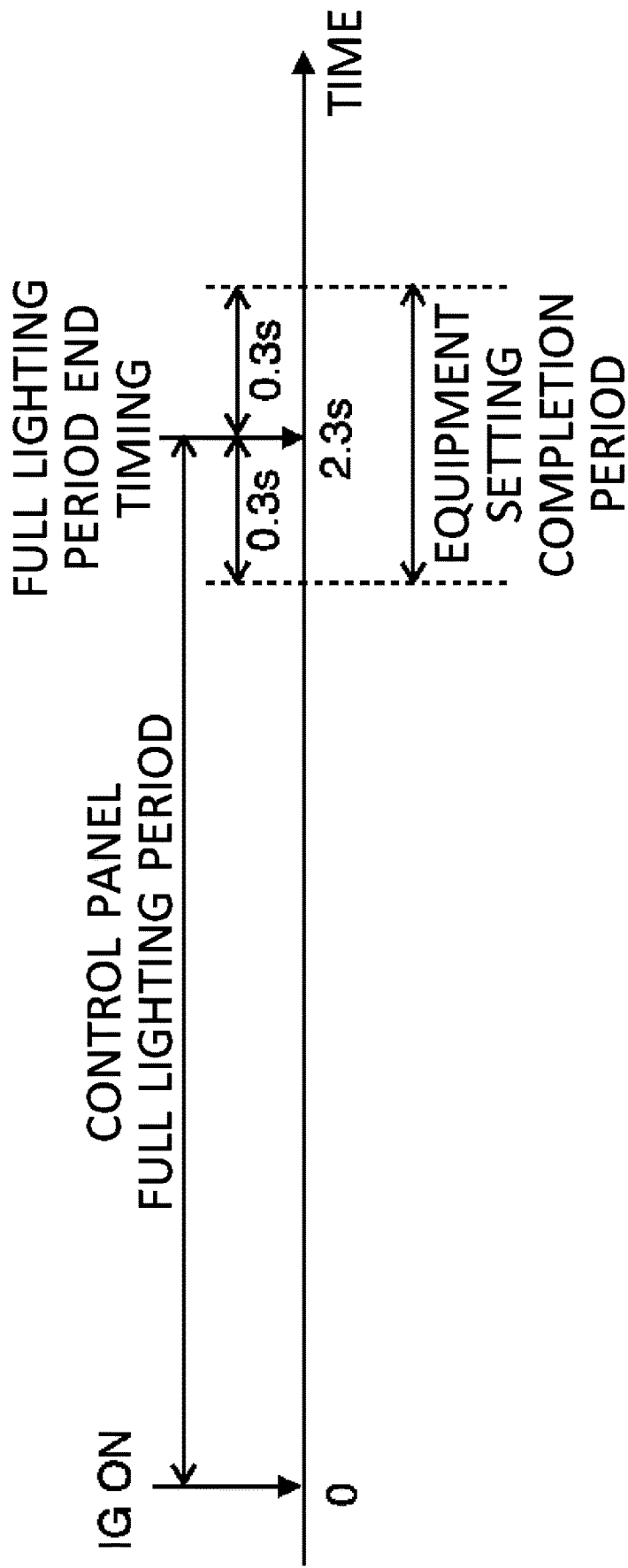
FIG. 6 is a diagram for explaining a timing at which settings of the first equipment 14a and the second equipment 14b are completed.

FIG. 6 is a diagram for explaining a timing at which settings of the first equipment 14*a* and the second equipment 14*b* are completed. When an ignition (IG) power supply is turned on, a full lighting period in which all lighting elements of the control panel 16 are lit starts. In the present embodiment, the full lighting period is about 2.3 seconds.

In the present embodiment, the timing at which the settings of the first equipment 14*a* and the second equipment 14*b* are to be completed is within a period of 0.3 seconds before and after an end timing of the full lighting period. That is, the timing at which the settings of the first equipment 14*a* and the second equipment 14*b* are to be completed is within a period of 2 seconds to 2.6 seconds after IG ON. The transmission control unit 220 determines a transmission timing of the first setting information and the second setting information such that the settings of the first equipment 14*a* and the second equipment 14*b* are completed within a period of 0.3 seconds before and after the end timing of the full lighting period.

By determining the equipment setting completion period during which the settings of the first equipment 14*a* and the second equipment 14*b* are to be completed in this manner, the settings of the first equipment 14*a* and the second equipment 14*b* can be completed at substantially the same timing as the timing at which the full lighting period of the control panel 16 ends. Accordingly, since the user settings of the first equipment 14*a* and the second equipment 14*b* are reflected on a display on the equipment setting display apparatus 18 at substantially the same timing as the timing at which the full lighting period of the control panel 16 ends, the user of the moving body 10 can feel that the user setting system is operating properly.

A time difference of 0.3 seconds may be generated between the timing at which the settings of the first equipment 14*a* and the second equipment 14*b* are to be completed and the end timing of the full lighting period. However, since the control panel 16 and the equipment setting display apparatus 18 are provided at different positions, it takes a time of about 0.3 seconds for the user to first recognize that the full lighting period of the control panel 16 has ended and then look in a direction of the equipment setting display apparatus 18 to recognize the display of the equipment setting display apparatus 18. Conversely, it takes a time of about 0.3 seconds for the user to first look at the equipment setting display apparatus 18 to recognize that the user setting has been reflected on the display on the equipment setting display apparatus 18 and then look in the direction of the control panel 16 to recognize the display of the control panel 16. Therefore, even if there is a time difference of about 0.3 seconds, it is difficult for the user of the moving body 10 to practically feel a time lag.

Figure 7:
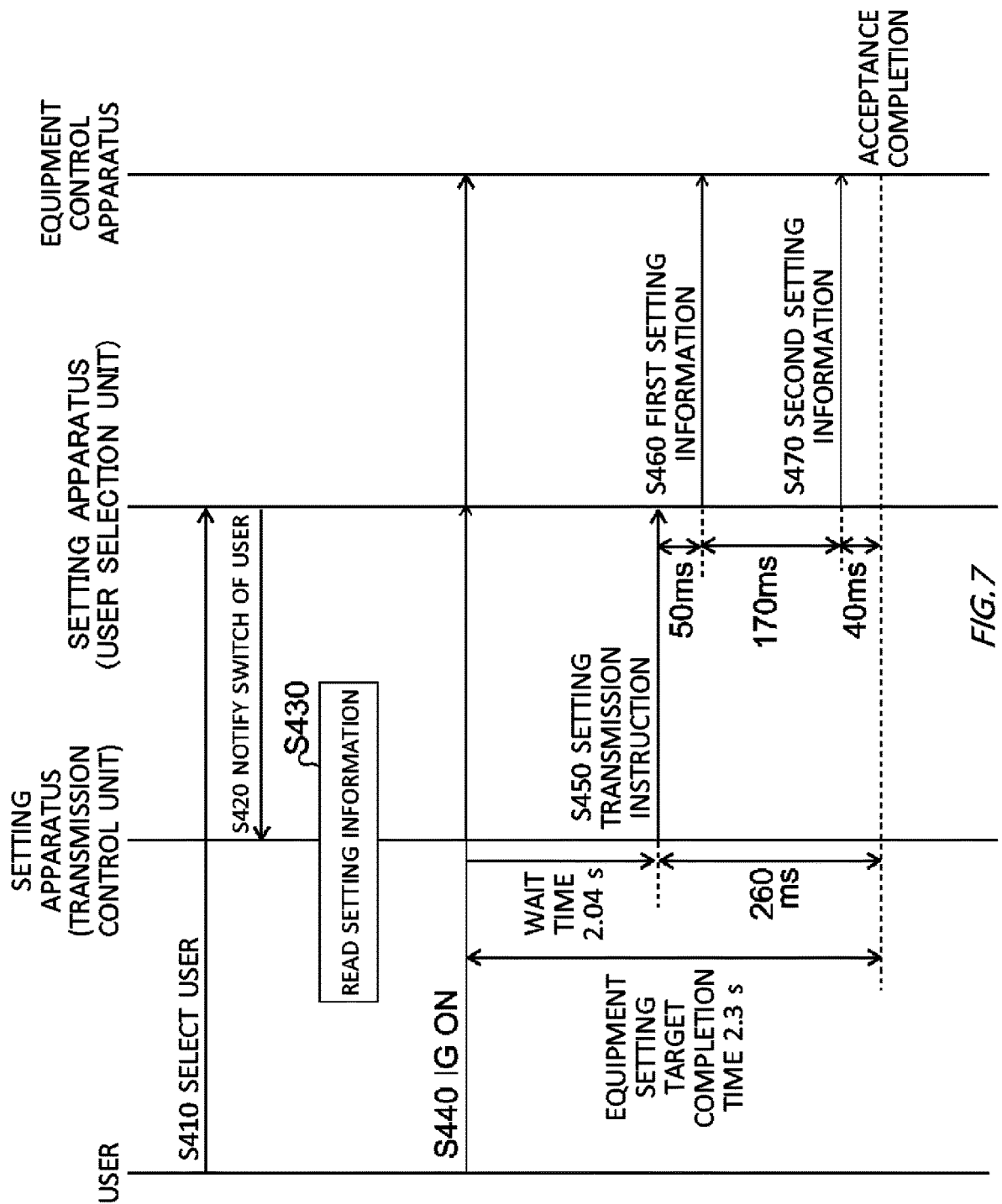
FIG. 7 shows an execution sequence of processing by a user, the setting apparatus 100, and an equipment control apparatus 110.

FIG. 7 shows an execution sequence of processing by a user, the setting apparatus 100, and an equipment control apparatus 110. In the present sequence, out of the setting apparatus 100, a function of the transmission control unit 220 which performs reading of setting information and control of a transmission timing of the setting information and a function of the user selection unit 230 which becomes an external interface related to the user selection in the moving body 10 are illustrated as different functional blocks.

In S410, a user is selected by a user operation made by the user of the moving body 10, the FOB key, or the like. Upon detecting the user selection, the user selection unit 230 outputs a user switch notification including a user ID to the transmission control unit 220 in S420. Upon acquiring the user switch notification, the transmission control unit 220 references user setting information and reads setting information in S430.

In S440, when the IG power supply is tuned on by the user, operations of the respective control apparatuses in the moving body 10 including the equipment control apparatus 110 start. Upon detecting IG ON, the transmission control unit 220 outputs a setting information transmission instruction at a timing at which 2.04 seconds have elapsed since the timing at which IG ON has been detected (S450). This "2.04 seconds" is a time that has been determined so that the timing at which the setting information is reflected on the equipment control apparatus 110 becomes 2.3 seconds after IG ON.

Specifically, after the setting transmission instruction is output to the user selection unit 230 in S450, the user selection unit 230 performs processing for transmitting first setting information to the equipment control apparatus 110 (S460). In terms of design, the user selection unit 230 is guaranteed to perform this processing within 50 ms. In addition, as will be described later, the equipment control apparatus 110 waits for second setting information to be transmitted only for a maximum of 170 ms after receiving the first setting information transmitted in S460. Therefore, the user selection unit 230 is designed to transmit the second setting information within 170 ms after transmitting the first setting information (S470).

Further, in terms of design, the equipment control apparatus 110 is guaranteed to perform acceptance processing of the received second setting information within 40 ms. Therefore, it is predicted that a time of a maximum of 260 ms is required before the equipment control apparatus 110 accepts the second setting information after the setting transmission instruction is transmitted in S450. Thus, by setting the wait time of 2.04 s before the transmission control unit 220 outputs the setting information transmission instruction after IG ON, even when a predicted maximum time is required, the equipment control apparatus 110 can accept the setting information at a time point of 2.3 seconds from IG ON.

Figure 8:
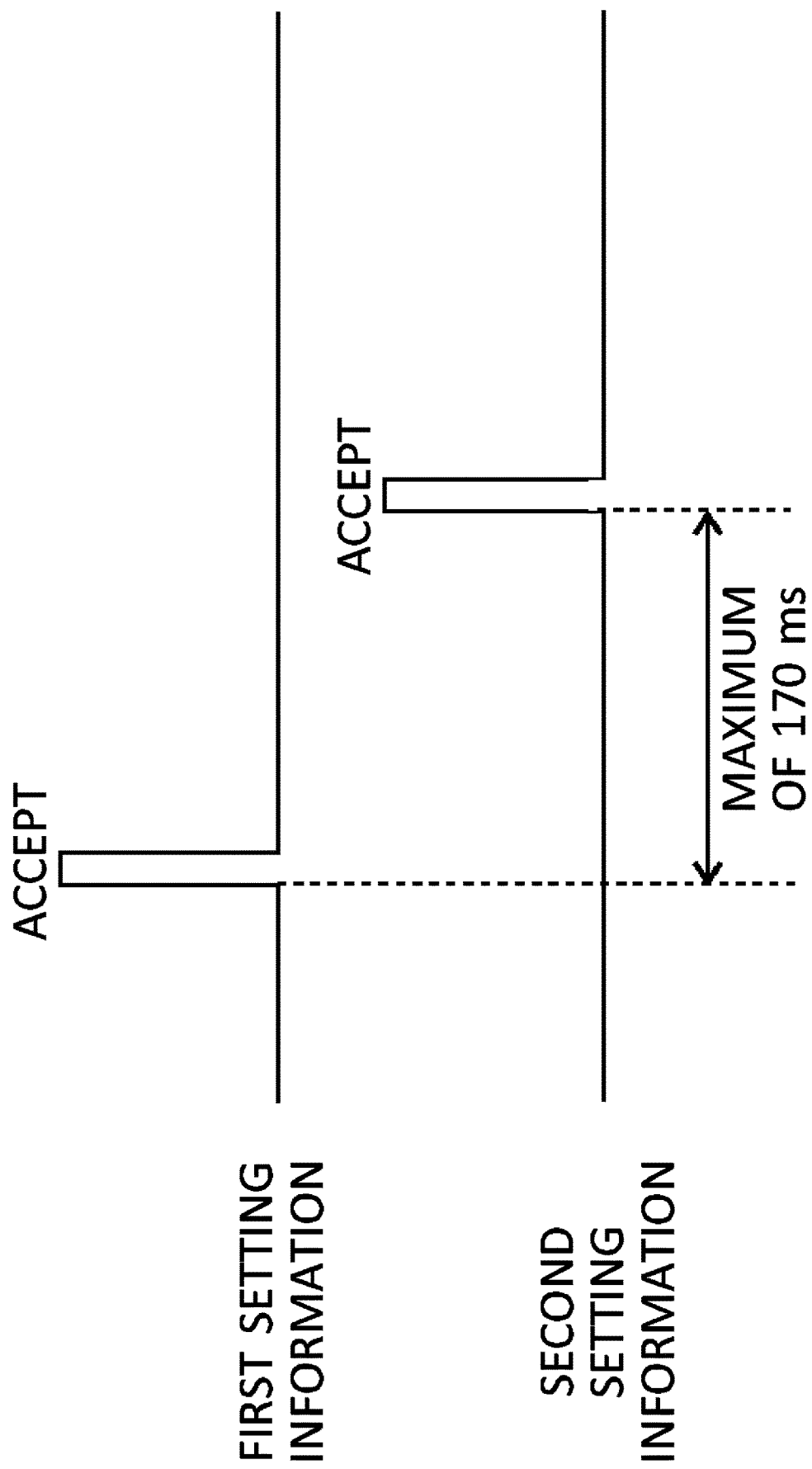
FIG. 8 is a diagram for explaining a setting information acceptance requirement of the equipment control apparatus 110.

FIG. 8 is a diagram for explaining a setting information acceptance requirement of the equipment control apparatus 110. When receiving second setting information within 170 ms since receiving first setting information, the equipment control apparatus 110 accepts the first setting information and the second setting information, sets the first equipment 14*a* based on the accepted first setting information, and sets the second equipment 14*b* based on the accepted second setting information. Conversely, when the second setting information is not received within 170 ms since receiving the first setting information, the equipment control apparatus 110 sets the first equipment 14*a* based on the accepted first setting information and does not change the setting of the second equipment 14*b*.

The equipment control apparatus 110 accepts the second setting information only when the second setting information is received within 170 ms since the reception timing of the accepted first setting information. That is, the equipment control apparatus 110 discards the second setting information received in a state where the first setting information is not accepted.

Figure 9:
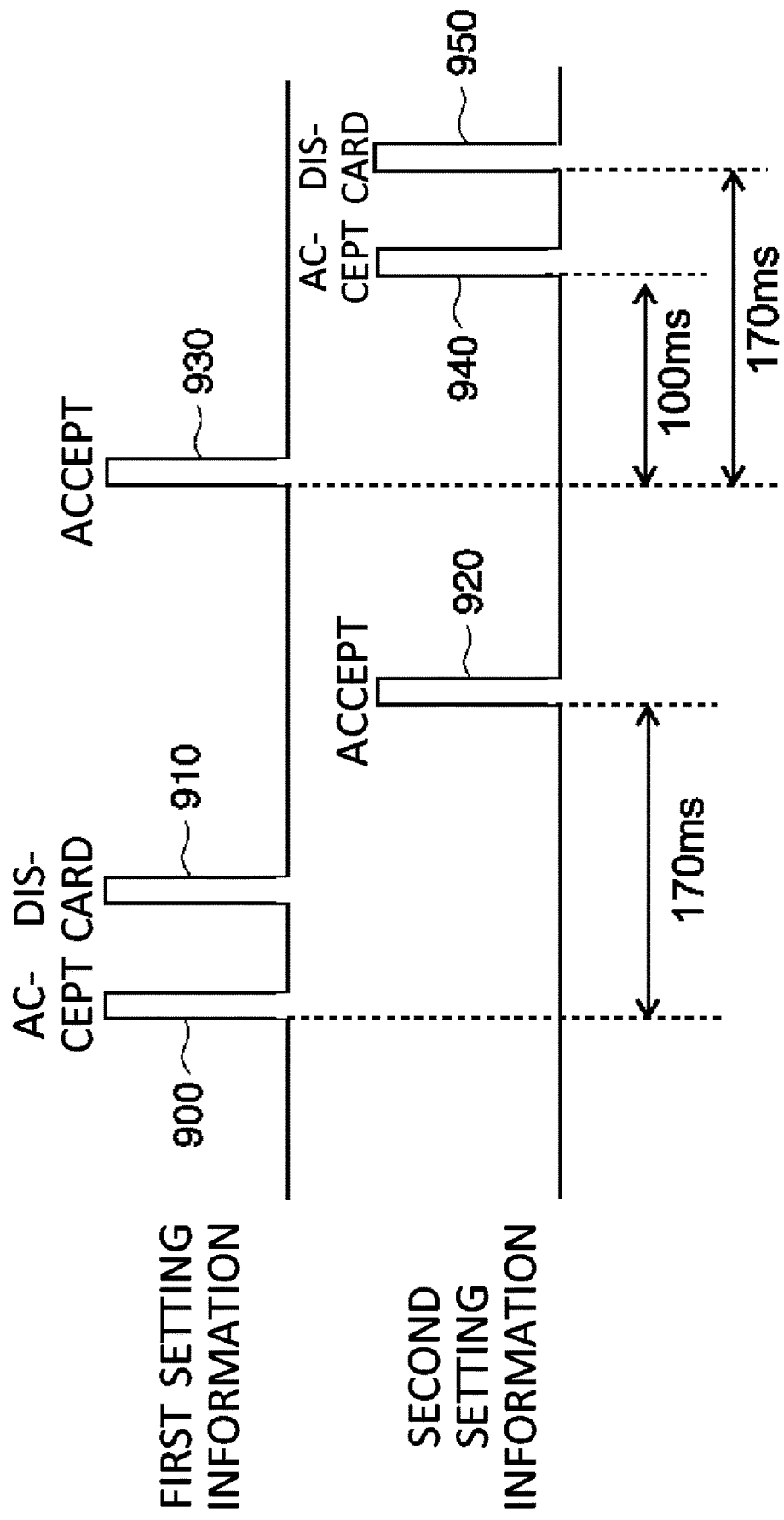
FIG. 9 shows an example of setting information acceptance processing by the equipment control apparatus 110.

FIG. 9 shows an example of setting information acceptance processing by the equipment control apparatus 110. As shown in FIG. 9, when receiving new first setting information 910 within 170 ms since receiving first setting information 900, the equipment control apparatus 110 discards the new first setting information 910. As described in relation to FIG. 8, when receiving one piece of second setting information 920 within 170 ms since receiving the first setting information 900, the equipment control apparatus 110 accepts the second setting information 920.

After that, the equipment control apparatus 110 accepts first setting information 930 that is received first after a timing at which a time exceeding 170 ms has elapsed since the reception of the first setting information 900. Further, the equipment control apparatus 110 accepts first second setting information 940 that has been received within 170 ms since the reception of the first setting information 930. After that, even if new second setting information 950 is received within 170 ms since the reception of the first setting information 930, the equipment control apparatus 110 does not accept the new second setting information 950. In this manner, when a plurality of pieces of first setting information are received within 170 ms, the equipment control apparatus 110 accepts only the first setting information that has been received first, and discards the other pieces of first setting information. Similarly, when a plurality of pieces of second setting information are received within 170 ms since the reception of the accepted first setting information, the equipment control apparatus 110 accepts only the second setting information that has been received first, and discards the other pieces of second setting information. Accordingly, even when a plurality of pieces of setting information are transmitted in a short time due to noises or the like, the equipment control apparatus 110 can accept one proper combination of the first setting information and the second setting information.

According to the moving body setting system 20 described above, even when a plurality of pieces of equipment of the same type need to be set using a plurality of messages, the setting of the equipment can be completed at a timing matching with the setting timing of other equipment without causing a delay in the setting of the equipment. Accordingly, it becomes possible to flexibly cope with an addition of equipment due to a change in the design of the moving body 10. Further, even when a plurality of messages are transmitted due to noises or the like, the equipment control apparatus 110 can properly accept a setting for one user.

In the embodiment described above, the moving body 10 is a vehicle. However, any moving body other than the vehicle may be applied as the moving body 10. For example, the moving body 10 may be transportation equipment such as a train, an airplane, and a ship.

Figure 10:
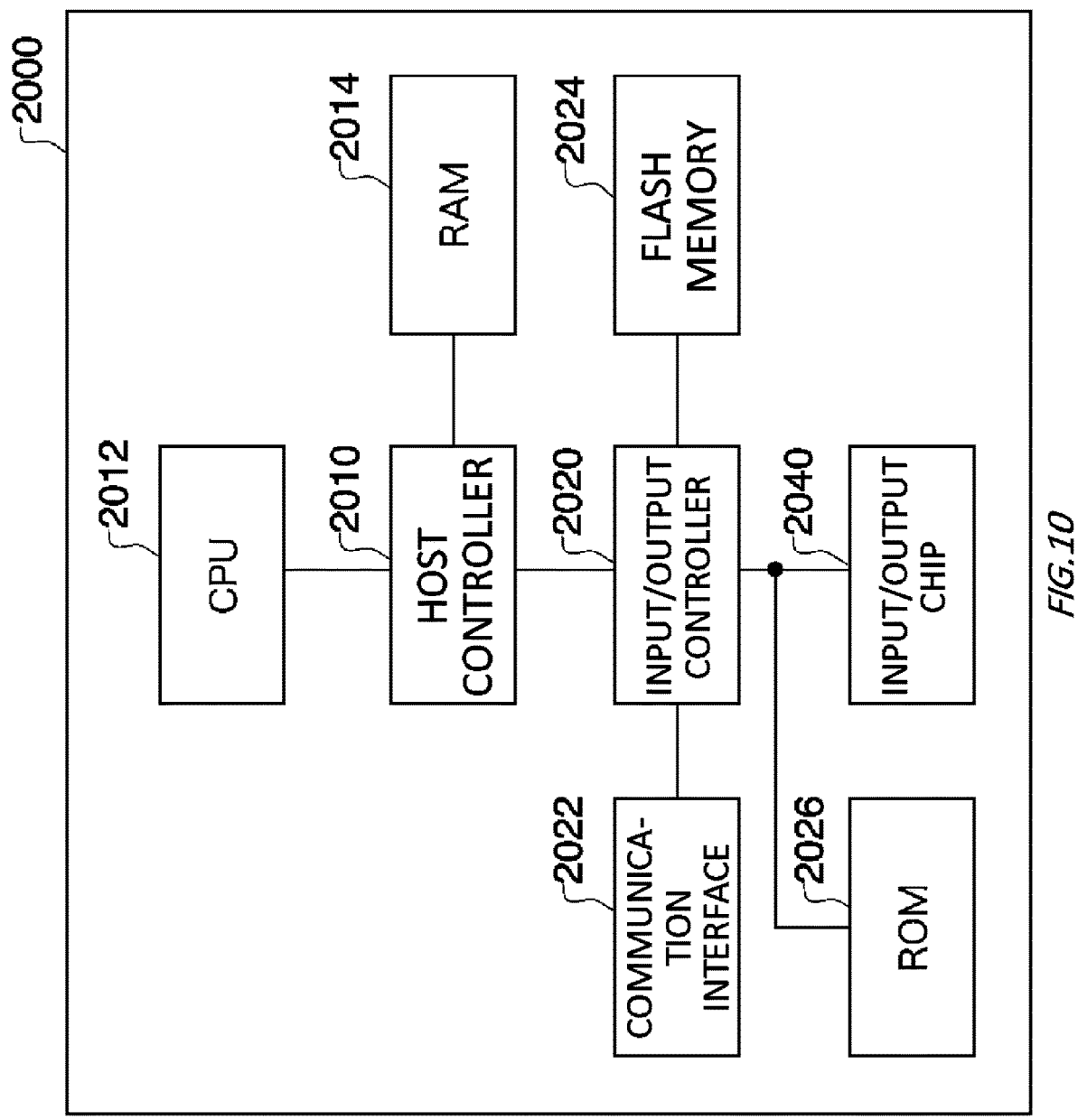
FIG. 10 shows an example of a computer 2000.

FIG. 10 shows an example of a computer 2000 in which a plurality of embodiments of the present invention may be entirely or partially embodied. Programs installed in the computer 2000 can cause the computer 2000 to function as the moving body setting system 20 according to the embodiment, each unit of the system, various apparatuses such as the setting apparatus 100 and the equipment control apparatus 110, or each unit of the apparatuses, or can cause the computer 2000 to execute operations associated with the system, each unit of the system, the apparatuses, or each unit of the apparatuses, and/or can cause the computer 2000 to execute a process according to the embodiment or steps of the process. Such programs may be executed by a CPU 2012 to cause the computer 2000 to execute certain operations associated with the processing procedures described herein and some of or all of the blocks in the block diagrams.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, thereby controlling each unit.

The communication interface 2022 communicates with other electronic devices via a network. The flash memory 2024 stores programs and data used by the CPU 2012 within the computer 2000. The ROM 2026 stores therein a boot program or the like executed by the computer 2000 at the time of activation, and/or a program depending on the hardware of the computer 2000. The input/output chip 2040 may connect various input/output units such as a keyboard, a mouse, and a monitor to the input/output controller 2020 via input/output ports such as a serial port, a parallel port, a keyboard port, a mouse port, a monitor port, a USB port, and an HDMI (registered trademark) port.

A program is provided via a network or computer readable storage media such as a CD-ROM, a DVD-ROM, or a memory card. The RAM 2014, the ROM 2026, or the flash memory 2024 is an example of the computer readable storage medium. Programs are installed in the flash memory 2024, the RAM 2014, or the ROM 2026 and executed by the CPU 2012. The information processing written in these programs is read by the computer 2000, and thereby cooperation between a program and the above-described various types of hardware resources is achieved. An apparatus or method may be constituted by carrying out the operation or processing of information by using the computer 2000.

For example, when communication is executed between the computer 2000 and an external device, the CPU 2012 may execute a communication program loaded onto the RAM 2014 to instruct the communication interface 2022 to perform communication processing, based on the processing written in the communication program. The communication interface 2022, under control of the CPU 2012, reads transmission data stored on transmission buffering regions provided in recording media such as the RAM 2014 and the flash memory 2024, and transmits the read transmission data to a network and writes reception data received from a network to reception buffering regions or the like provided on the recording media.

In addition, the CPU 2012 may cause all or necessary portions of a file or a database to be read into the RAM 2014, the file or the database having been stored in a recording medium such as the flash memory 2024, and perform various types of processing on the data on the RAM 2014. The CPU 2012 may then write back the processed data to the recording medium.

Various types of information, such as various types of programs, data, tables, and databases, may be stored in the recording medium to undergo information processing. The CPU 2012 may execute various types of processing on the data read from the RAM 2014, which includes various types of operations, information processing, conditional judging, conditional branch, unconditional branch, search/replace of information, etc., as described herein and designated by an instruction sequence of programs, and writes the result back to the RAM 2014. In addition, the CPU 2012 may search for information in a file, a database, etc., in the recording medium. For example, when a plurality of entries, each having an attribute value of a first attribute associated with an attribute value of a second attribute, are stored in the recording medium, the CPU 2012 may search for an entry matching the condition whose attribute value of the first attribute is designated, from among the plurality of entries, and read the attribute value of the second attribute stored in the entry, thereby acquiring the attribute value of the second attribute associated with the first attribute satisfying the preset condition.

The programs or software modules described above may be stored in the computer readable storage medium on the computer 2000 or in the vicinity of the computer 2000. A recording medium such as a hard disk or a RAM provided in a server system connected to a dedicated communication network or the Internet can be used as the computer readable storage media. A program stored in the computer readable storage medium may be provided to the computer 2000 via a network.

A program, which is installed on the computer 2000 and causes the computer 2000 to function as the moving body setting system 20, may work on the CPU 2012 or the like to cause the computer 2000 to function as each unit of the moving body setting system 20. The information processing written in these programs is read into the computer 2000, thereby functioning as each unit of the moving body setting system 20 as specific means in which software and the various hardware resources described above cooperate with one another. Then, by the specific means realizing calculation or processing of information according to a purpose of use of the computer 2000 in the present embodiment, a unique moving body setting system 20 according to the purpose of use is constructed.

A program, which is installed on the computer 2000 and causes the computer 2000 to function as the setting apparatus 100, may work on the CPU 2012 or the like to cause the computer 2000 to function as each unit of the setting apparatus 100. The information processing written in these programs is read into the computer 2000, thereby functioning as each unit of the setting apparatus 100 as specific means in which software and the various hardware resources described above cooperate with one another. Then, by the specific means realizing calculation or processing of information according to a purpose of use of the computer 2000 in the present embodiment, a unique setting apparatus 100 according to the purpose of use is constructed.

A program, which is installed on the computer 2000 and causes the computer 2000 to function as the equipment control apparatus 110, may work on the CPU 2012 or the like to cause the computer 2000 to function as each unit of the equipment control apparatus 110. The information processing written in these programs is read into the computer 2000, thereby functioning as each unit of the equipment control apparatus 110 as specific means in which software and the various hardware resources described above cooperate with one another. Then, by the specific means realizing calculation or processing of information according to a purpose of use of the computer 2000 in the present embodiment, a unique equipment control apparatus 110 according to the purpose of use is constructed.

Various embodiments have been described by referring to the block diagrams and the like. Each block in the block diagrams may represent (1) steps of processes in which operations are executed or (2) units of apparatuses responsible for executing operations. Certain steps and units may be implemented by a dedicated circuit, a programmable circuit supplied with computer readable instructions stored on computer readable storage media, and/or processors supplied with computer readable instructions stored on computer readable storage media. The dedicated circuit may include digital and/or analog hardware circuits and may include integrated circuits (IC) and/or discrete circuits. The programmable circuit may include reconfigurable hardware circuits including logical AND, logical OR, logical XOR, logical NAND, logical NOR, and other logical operations, flip-flops, registers, memory elements, etc., such as field-programmable gate arrays (FPGA), programmable logic arrays (PLA), etc.

Computer readable storage media may include any tangible device that can store instructions for execution by a suitable device, such that the computer readable storage medium having instructions stored therein forms at least a portion of an article of manufacture including instructions which can be executed to create means for executing processing procedures or operations specified in the block diagrams. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disk (DVD), a Blu-ray (registered trademark) disk, a memory stick, an integrated circuit card, or the like.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer readable instructions may be provided to a processor of a general purpose computer, special purpose computer, or other programmable data processing apparatus, or to programmable circuit, locally or via a local area network (LAN), a wide area network (WAN) such as the Internet, etc., to execute the computer readable instructions to provide means for executing the described processing procedures or operations specified in the block diagrams. An example of the processor includes a computer processor, processing unit, microprocessor, digital signal processor, controller, microcontroller, or the like.

While the present invention has been described with the embodiments, the technical scope of the present invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the present invention.

Note that the operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the operation flow is described by using phrases such as "first" or "next" in the scope of the claims, specification, or drawings, it does not necessarily mean that the process must be performed in this order.

What is claimed is:

1. A moving body setting system, comprising:
   at least one processor;
   an equipment control apparatus that uses the at least one processor that controls first equipment and second equipment included in a moving body; and
   a setting apparatus including: a storage unit that uses the at least one processor that stores setting information of each of the first equipment and the second equipment in association with user information; a user selection unit that uses the at least one processor that selects a user of the moving body; and
   a transmission control unit that uses the at least one processor hat reads, from the storage unit, the setting information of each of the first equipment and the second equipment associated with user information of the user selected by the user selection unit, and perform control for transmitting, to the equipment control apparatus, first setting information which is based on the setting information of the first equipment that has been read and second setting information which is based on the setting information of the second equipment, wherein the equipment control apparatus uses the at least one processor that changes, when one setting information of the first setting information or the second setting information is received first and then another setting information of the first setting information or the second setting information is received within a predetermined time thereafter, settings of both the first equipment and the second equipment based on the one setting information that has been received and the another setting information that has been received within the predetermined time;

wherein when the one setting information is received a plurality of times before the another setting information is received, the equipment control apparatus uses the at least one processor that discards setting information other than setting information that has been received first out of a plurality of pieces of the one setting information that has been received the plurality of times, and change, when the another setting information is received, the settings of both the first equipment and the second equipment based on the setting information that has been received first and the another setting information.

2. The moving body setting system according to claim 1, wherein when the another setting information is not received within the predetermined time since reception of the one setting information, the equipment control apparatus uses the at least one processor that changes the setting of the corresponding one of the first equipment or the second equipment based on the one setting information.

3. The moving body setting system according to claim 1, wherein when the first setting information includes user information and the second setting information does not include user information, the equipment control apparatus uses the at least one processor that discards, when the second setting information is received in a state where the first setting information is not received, the second setting information without changing the setting of the second equipment.

4. The moving body setting system according to claim 2, wherein when the first setting information includes user information and the second setting information does not include user information, the equipment control apparatus uses the at least one processor that discards, when the second setting information is received in a state where the first setting information is not received, the second setting information without changing the setting of the second equipment.

5. The moving body setting system according to claim 1, wherein when the another setting information is received a plurality of times after the one setting information is received, the equipment control apparatus uses the at least one processor that discards setting information other than setting information that has been received first out of a plurality of pieces of the another setting information that has been received the plurality of times, and change the settings of both the first equipment and the second equipment based on the one setting information and the setting information that has been received first out of the plurality of pieces of the another setting information that has been received the plurality of times.

6. The moving body setting system according to claim 2, wherein when the another setting information is received a plurality of times after the one setting information is received, the equipment control apparatus uses the at least one processor that discards setting information other than setting information that has been received first out of a plurality of pieces of the another setting information that has been received the plurality of times, and change the settings of both the first equipment and the second equipment based on the one setting information and the setting information that has been received first out of the plurality of pieces of the another setting information that has been received the plurality of times.

7. The moving body setting system according to claim 1, wherein the first equipment is a front seat air conditioner, and the second equipment is a rear seat air conditioner.

8. The moving body setting system according to claim 2, wherein the first equipment is a front seat air conditioner, and the second equipment is a rear seat air conditioner.

9. The moving body setting system according to claim 1, wherein the moving body is a vehicle.

10. The moving body, comprising: the moving body having the moving body setting system according to claim 1.

11. A method, comprising:

storing setting information of each of first equipment and second equipment included in a moving body in a storage unit in association with user information;

selecting a user of the moving body;

reading, from the storage unit, the setting information of each of the first equipment and the second equipment associated with user information of the user selected in the selecting a user of the moving body;

transmitting first setting information which is based on the setting information of the first equipment and second setting information which is based on the setting information of the second equipment to an equipment control apparatus configured to control the first equipment and the second equipment, the setting information of each of the first equipment and the second equipment having been read in the reading the setting information of each of the first equipment and the second equipment from the storage unit; and changing, by the equipment control apparatus, when one setting information of the first setting information or the second setting information is received first and then another setting information of the first setting information or the second setting information is received within a predetermined time thereafter, settings of both the first equipment and the second equipment based on the one setting information that has been received and the another setting information that has been received within the predetermined time;

wherein when the one setting information is received a plurality of times before the another setting information is received, the equipment control apparatus discards setting information other than setting information that has been received first out of a plurality of pieces of the one setting information that has been received the plurality of times, and changes, when the another setting information is received, the settings of both the first equipment and the second equipment based on the setting information that has been received first and the another setting information.

12. A non-transitory computer readable storage medium having stored thereon a program for causing a computer having at least one processor that functions as:
an equipment control apparatus that uses the at least one processor that controls first equipment and second equipment included in a moving body; and
a setting apparatus including: a storage unit that uses the at least one processor that stores setting information of each of the first equipment and the second equipment in association with user information; a user selection unit that uses the at least one processor that selects a user of the moving body; and a transmission control unit that uses the at least one processor that reads, from the storage unit, the setting information of each of the first equipment and the second equipment associated with user information of the user selected by the user selection unit, and perform control for transmitting, to the equipment control apparatus, first setting information which is based on the setting information of the first equipment that has been read and second setting information which is based on the setting information of the second equipment,
wherein the equipment control apparatus uses the at least one processor that changes, when one setting information of the first setting information or the second setting information is received first and then another setting information of the first setting information or the second setting information is received within a predetermined time thereafter, settings of both the first equipment and the second equipment based on the one setting information that has been received and the another setting information that has been received within the predetermined time;
wherein when the one setting information is received a plurality of times before the another setting information is received, the equipment control apparatus uses the at least one processor that discards setting information other than setting information that has been received first out of a plurality of pieces of the one setting information that has been received the plurality of times, and change, when the another setting information is received, the settings of both the first equipment and the second equipment based on the setting information that has been received first and the another setting information.

* * * * *